United States Patent
Hsieh

(10) Patent No.: US 8,311,755 B2
(45) Date of Patent: Nov. 13, 2012

(54) SAMPLING RATE ADJUSTMENT SYSTEM AND METHOD

(75) Inventor: Ming-Chih Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 246 days.

(21) Appl. No.: 12/845,731

(22) Filed: Jul. 29, 2010

(65) Prior Publication Data

US 2011/0270554 A1    Nov. 3, 2011

(30) Foreign Application Priority Data

Apr. 30, 2010   (TW) ............................... 99113774 A

(51) Int. Cl.
*G01R 23/00* (2006.01)
(52) U.S. Cl. .......................................................... 702/75
(58) Field of Classification Search ...................... 702/75
See application file for complete search history.

(56) References Cited

U.S. PATENT DOCUMENTS 6,295,085 B1 *  9/2001  Munson et al. ............ 348/226.1
8,068,148 B2 * 11/2011  Noyes et al. ............... 348/226.1

* cited by examiner

*Primary Examiner* — Stephen Cherry
(74) *Attorney, Agent, or Firm* — Altis Law Group, Inc.

(57) ABSTRACT

A sampling rate adjustment system includes a detecting circuit and a processor. The detecting circuit detects a frequency of an alternating current (AC) power source and outputs a detecting signal. The processor receives the detecting signal of the detecting circuit and determines whether a difference between the frequency of the AC power source and a sampling rate of a camera is less than a predetermined value. The processor outputs a control signal to the camera and changes the sampling rate of the camera when the difference between the frequency of the AC power source and the sampling rate of the camera is less than the predetermined value.

7 Claims, 4 Drawing Sheets

SAMPLING RATE ADJUSTMENT SYSTEM AND METHOD

BACKGROUND

1. Technical Field

The present disclosure relates to a sampling rate adjustment system and a sampling rate adjustment method.

2. Description of Related Art

A sampling unit of a camera converts analog video signals to digital video signals with a certain sampling rate. For cameras such as for surveillance, an alternating current (AC) power source supplies power to the camera. Frequency of most AC power source is about 50 hertz (HZ) or about 60 HZ. Definition of images captured by the camera will be decreased when the sampling rate of the sampling unit is near the frequency of the power. A user has to change the sampling rate of the sampling unit manually to increase the definition of the images.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

Figure 1:
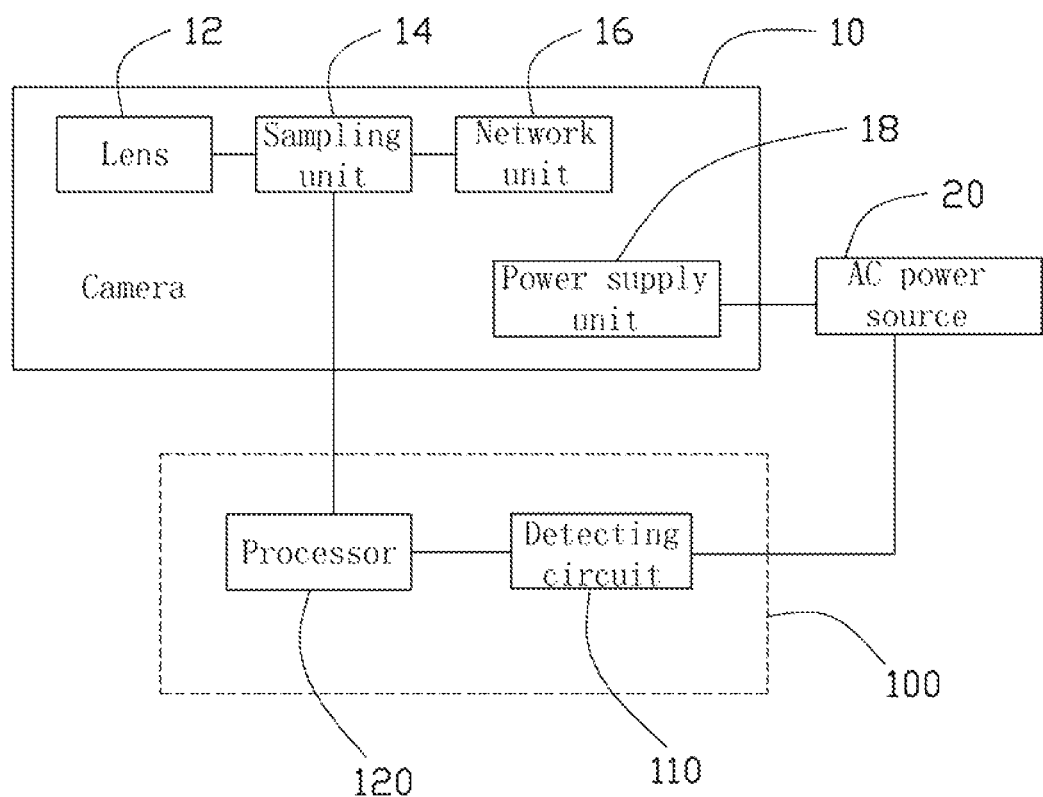
FIG. 1 is a schematic block diagram of an exemplary embodiment of a sampling rate adjustment system, connected between a camera and an alternating current (AC) power source, the sampling rate adjustment system includes a detecting circuit.

Referring to FIG. 1, an exemplary embodiment of a sampling rate adjustment system 100 detects a frequency of an alternating current (AC) power source 20 and changes a sampling rate of a camera 10. The sampling rate adjustment system 100 includes a detecting circuit 110 and a processor 120.

A first terminal of the detecting circuit 110 is connected to the AC power source 20. A second terminal of the detecting circuit 110 is connected to a first terminal of the processor 120. A second terminal of the processor 120 is connected to the camera 10.

The camera 10 includes a lens 12, a sampling unit 14, a network unit 16, and a power supply unit 18.

The lens 12 captures analog video signals. The sampling unit 14 converts the analog video signals to digital video signals with a certain sampling rate. The sampling unit 14 also outputs a square wave signal with a frequency the same as the sampling rate of the sampling unit 14 to the processor 120. The network unit 16 transmits the digital video signals to a display (not shown). The power supply unit 18 converts alternating current of the AC power source 20 to direct current and supplies power to the camera 10.

The detecting circuit 110 detects the frequency of the AC power source 20 and outputs a detecting signal.

The processor 120 receives the detecting signal of the detecting circuit 110 and the square wave signal of the sampling unit 14, to determine whether a difference between the frequency of the AC power source 20 and the sampling rate of the sampling unit 14 is less than a predetermined value. The processor 120 outputs a control signal to the sampling unit 14 and changes the sampling rate of the sampling unit 14 when the difference between the frequency of the AC power source 20 and the sampling rate of the sampling unit 14 is less than the predetermined value. In the embodiment, the predetermined value is 10 hertz (HZ).

Figure 2:
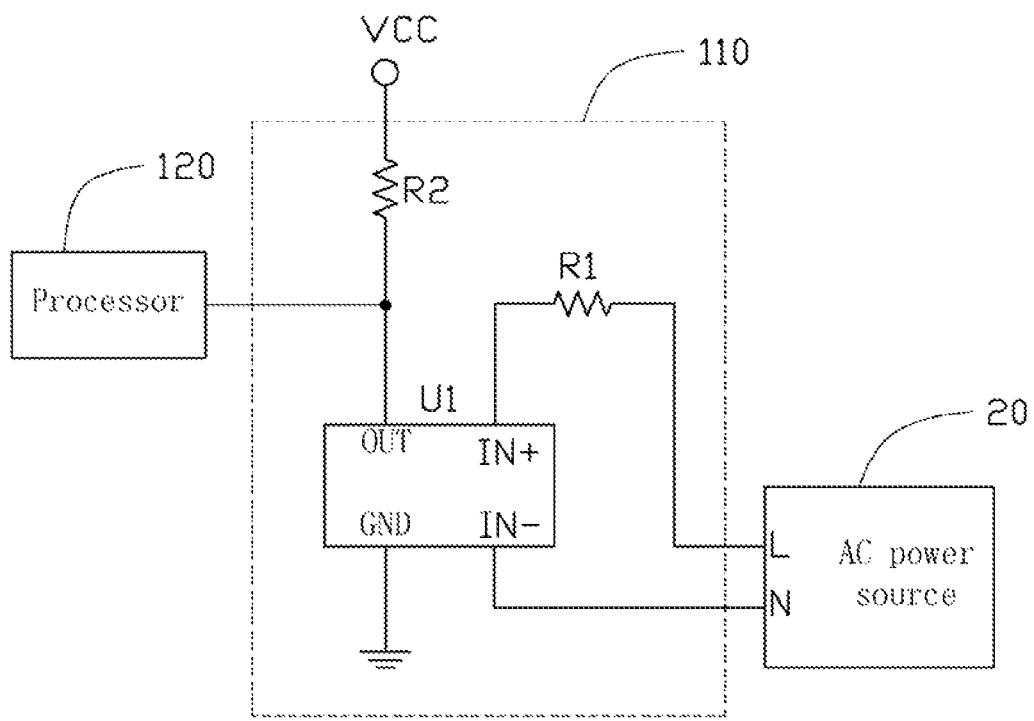
FIG. 2 is a circuit diagram of the detecting circuit of FIG. 1, the detecting circuit includes an optical coupler.

Referring to FIG. 2, the detecting circuit 110 includes an optical coupler U1, resistors R1 and R2.

The optical coupler U1 is an LTV-814 optical coupler. The optical coupler U1 includes a positive input IN+, a negative input IN−, an output OUT, and a ground terminal GND. The positive input IN+ of the optical coupler U1 is connected to a hot line L of the AC power source 20 through the resistor R1. The negative input IN− of the optical coupler U1 is connected to a ground line N of the AC power source 20. The output OUT of the optical coupler U1 is connected to a power source VCC through the resistor R2. The output OUT of the optical coupler U1 is also connected to the processor 120.

Figure 3:
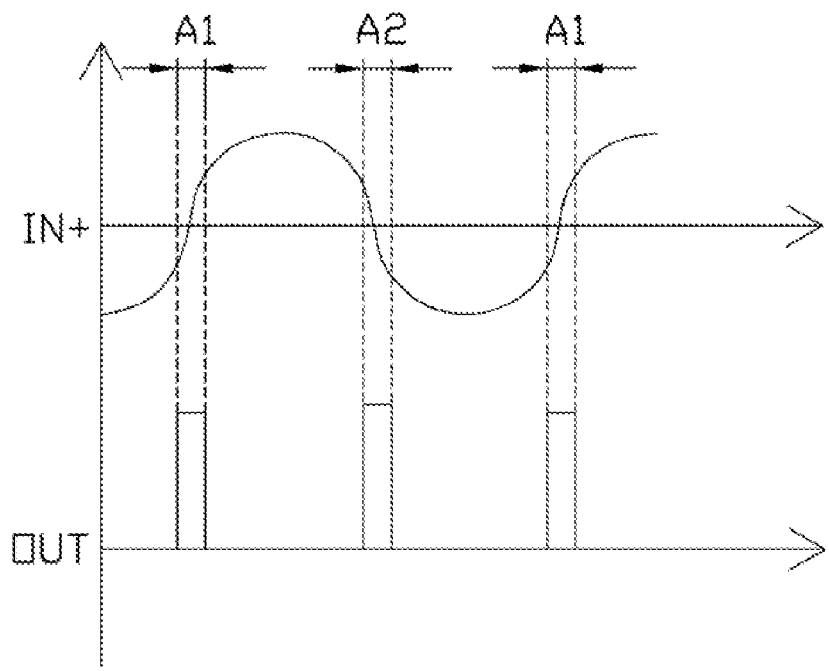
FIG. 3 is a graph showing signal waveforms obtained at a positive input and an output of the optical coupler of FIG. 2.

Referring to FIG. 3, when the voltage of the hot line L of the AC power source 20 transitions from negative to positive (shown as A1 in FIG. 3) or transitions from positive to negative (shown as A2 in FIG. 3), the output OUT of the optical coupler U1 is at a high voltage level, such as 3.3 volts. Thus, the output OUT of the optical coupler U1 outputs the detecting signal. The frequency of the detecting signal is twice the frequency of the AC power source 20 because the AC power source 20 makes two transitions for each cycle.

The processor 120 determines whether the difference between the frequency of the AC power source 20 and the sampling rate of the sampling unit 14 is less than the predetermined value by comparing one-half of the frequency of the detecting signal of the optical coupler U1 and the frequency of the square wave signal of the sampling unit 14.

When the difference between one-half of the frequency of the detecting signal and the frequency of the square wave signal of the sampling unit 14 is less than the predetermined value, the processor 120 outputs the control signal to the sampling unit 14 and changes the sampling rate of the sampling unit 14. For example, when the sampling rate of the sampling unit 14 and the frequency of the AC power source 20 are both 50 HZ, the processor 120 changes the sampling rate of the sampling unit 14 to be 70 HZ.

Figure 4:
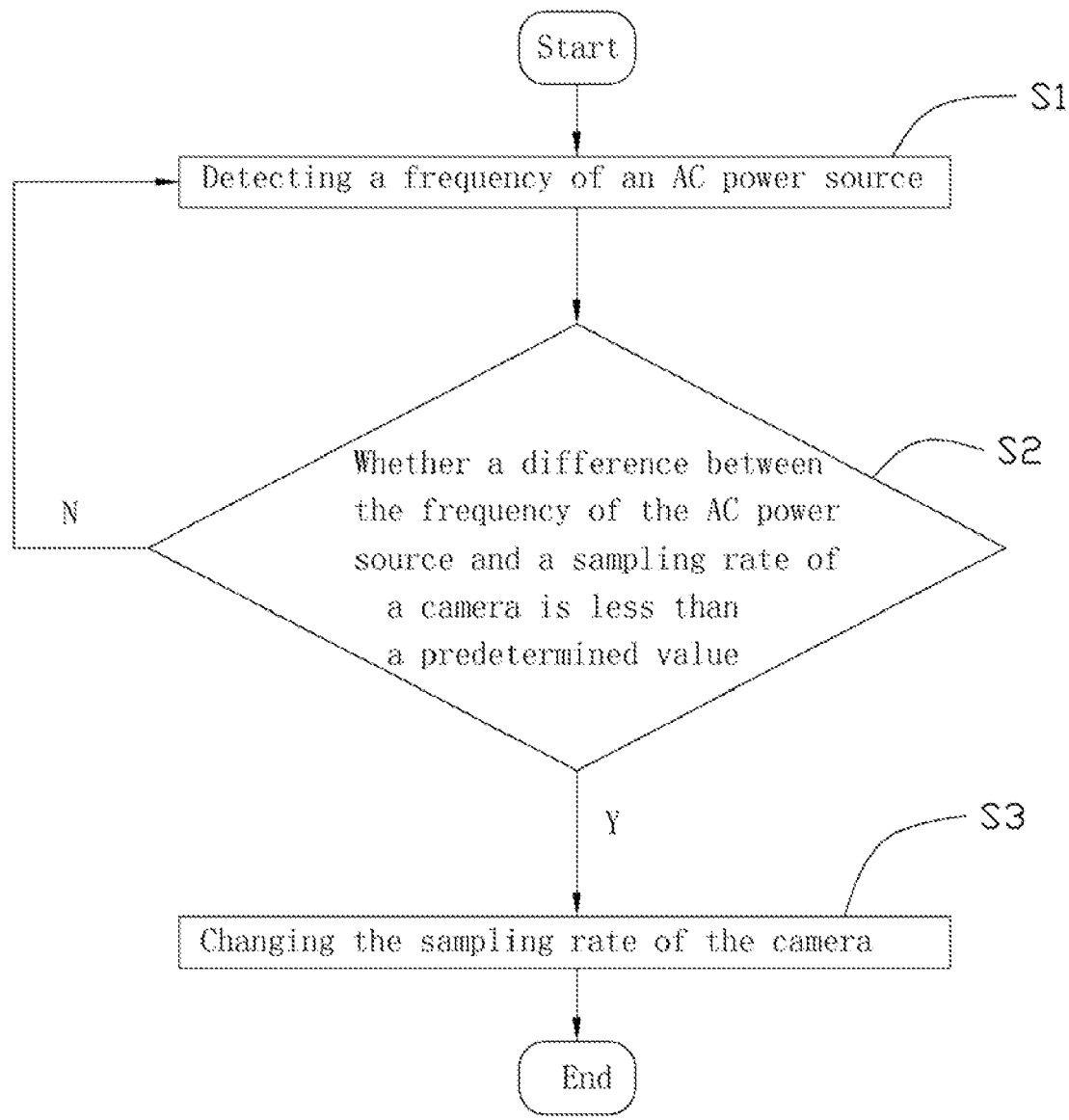
FIG. 4 is a flow chart of an exemplary embodiment of a sampling rate adjustment method.

Referring to FIG. 4, an embodiment of a sampling rate adjustment method includes the following steps.

In step 1, the detecting circuit 110 detects the frequency of the AC power source 20 and outputs a detecting signal. In the embodiment, a frequency of the detecting signal is twice the frequency of the AC power source 20.

In step 2, the processor 120 receives the detecting signal of the detecting circuit 110 and the square wave signal of the sampling unit 14. The processor 120 determines whether a difference between the frequency of the AC power source 20 and the sampling rate of the sampling unit 14 is less than a predetermined value. If the difference is not less than the predetermined value, the process goes to step 1.

In step 3, when the difference between the frequency of the AC power source 20 and the sampling rate of the sampling unit 14 is less than the predetermined value, the processor 120 outputs a control signal to the sampling unit 14 and changes the sampling rate of the sampling unit 14.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A sampling rate adjustment system connected between a camera and an alternating current (AC) power source, the sampling rate adjustment system comprising:
    a detecting circuit connected to the AC power source to detect a frequency of the AC power source and output a detecting signal accordingly; and
    a processor connected between the camera and the detecting circuit, wherein the processor receives the detecting signal of the detecting circuit and determines whether a difference between the frequency of the AC power source and a sampling rate of the camera is less than a predetermined value, the processor outputs a control signal to the camera and changes the sampling rate of the camera when the difference between the frequency of the AC power source and the sampling rate of the camera is less than the predetermined value.

2. The sampling rate adjustment system of claim 1, wherein the detecting circuit comprises an optical coupler, a first resistor, and a second resistor, the optical coupler includes a positive input, a negative input, an output, and a ground terminal, the positive input of the optical coupler is connected to a hot line of the AC power source through the first resistor, the negative input of the optical coupler is connected to a ground line of the AC power source, the ground terminal is grounded, the output of the optical coupler is connected to a power source through the second resistor, the output of the optical coupler is further connected to the processor, the output of the optical coupler outputs the detecting signal to the processor.

3. The sampling rate adjustment system of claim 1, wherein the frequency of the detecting signal is twice the frequency of the AC power source.

4. A sampling rate adjustment method for a camera, the sampling rate adjustment method comprising:
    detecting a frequency of an alternating current (AC) power source that supplies power to the camera, and outputting a detecting signal;
    determining whether a difference between the frequency of the AC power source and a sampling rate of the camera is less than a predetermined value; and
    changing the sampling rate of the camera when the difference between the frequency of the AC power source and the sampling rate of a camera is less than the predetermined value.

5. The sampling rate adjustment method of claim 4, wherein the frequency of the detecting signal is twice the frequency of the AC power source.

6. The sampling rate adjustment method of claim 5, wherein a processor determines whether the difference between the frequency of the AC power source and the sampling rate of the camera is less than the predetermined value by comparing one-half of the frequency of the detecting signal and the sampling rate of the camera.

7. A sampling rate adjustment system connected between a camera and an alternating current (AC) power source, the sampling rate adjustment system comprising:
    a detecting circuit to detect a frequency of the AC power source; and
    a processor, the processor connected to the camera and the detecting circuit, wherein the processor obtains the detected frequency of the AC power source from the detecting circuit and compares the detected frequency with a sampling rate frequency of the camera, the processor outputs a control signal to the camera and changes the sampling rate of the camera when the difference between the frequency of the AC power source and the sampling rate of the camera is less than the predetermined value.

* * * * *